Patented Sept. 26, 1922.

1,429,922

UNITED STATES PATENT OFFICE.

MAX BOCKMÜHL, OF HOCHST-ON-THE-MAIN, AND ADOLF SCHWARZ, OF FRANKFORT-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

ALIPHATIC DIALKYLAMINO ALKYL COMPOUNDS AND PROCESS OF MAKING SAME.

No Drawing.   Application filed September 13, 1921.   Serial No. 500,432.

*To all whom it may concern:*

Be it known that we, MAX BOCKMÜHL and ADOLF SCHWARZ, citizens of Germany, residing at Hochst-on-the-Main, Germany, and Frankfort-on-the-Main, Germany, respectively, have invented certain new and useful Improvements in Aliphatic Dialkylamino Alkyl Compounds and Processes of Making Same, of which the following is a specification.

According to our present invention, aliphatic dialkylaminoakyl compounds are obtained by causing alkalies to act upon molecular mixtures of halogen-alkyldialkylamines or their salts and the compounds of the type $R.CO.CH.(R_1).X$, wherein R and $R_1$ represent hydrogen or an alkyl residue, and X stands for a radicle which renders the carbon atom in the alpha position acid, for instance, CN, COO alkyl, COO aryl, CO alkyl, and CO aryl. The bodies thus obtained can be utilized as important and valuable parent material for the production of pharmaceutical preparations.

The following examples illustrate our invention:

*α—Diethylaminoethyl-acetoacetic ethylester.*

1. 136 parts of chlorethyldiethylamine are mixed with 130 parts of acetoacetic ethylester and there are then gradually introduced, while stirring, 57–58 parts of powdered caustic alkali which causes a lively reaction. After cooling, the mixture is stirred with benzene, the benzene solution is shaken with ammonia dried and subjected to fractional distillation. The diethylamino-ethyl acetoacetic ester distills over at 132–135° under a pressure of 10 mm.

2. 114 parts of caustic alkali are gradually introduced into 261 parts of bromoethyl-diethylamine hydrobromate and 130 parts of acetoacetic ethylester. The further treatment of the product is carried out as indicated in example 1.

*3. α—Dimethylaminoethyl-acetoacetic ethylester.*

This compound is obtained in an analogous manner as that described in example 1), from 108 parts of chlorethyldimethylamine, 130 parts of acetoacetic ester and 57–58 parts of powdered caustic alkali. It boils at 124° C. under a pressure of 12 mm.

*4. Diethylaminobutyl-acetoacetic ethylester.*

This compound is obtained in an analogous manner as that described in example 1) from 164 parts of diethylaminochlorobutanol

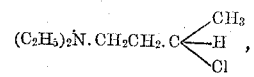

130 parts of aceto acetic ester and 57–58 parts of powdered caustic alkali. It boils at 138° C. under a pressure of 10 mm.

Having now described our invention, what we claim is:

1. The process of producing dialkylaminoalkyl compounds, which consists in causing caustic alkalies to act upon the molecular mixtures of halogen alkyl dialkylamines or their salts and bodies of the general formula:

$$R.CO.CH(R_1).X$$

wherein R and $R_1$ represent hydrogen or an alkyl residue, and X represents a radicle which renders the carbon atom in the alpha position acid.

2. As new products new compounds of the type:

$$R.CO.CR_2(R_1).X$$

wherein $R_2$ represents any dialkylaminoalkyl residue and R and $R_1$ represent hydrogen or an alkyl residue, and X represents a radicle which renders the carbon atom in the alpha position acid.

In testimony whereof, we affix our signatures.

Signed at Munich.

MAX BOCKMÜHL.

Signed at Frankfort-on-the-Main by

ADOLF SCHWARZ.